United States Patent [19]
Braidwood

[11] 3,937,596
[45] Feb. 10, 1976

[54] FLUID PUMP DRIVING CONTROL

[76] Inventor: Robert O. Braidwood, Fort Lauderdale, Fla.

[22] Filed: Jan. 24, 1975

[21] Appl. No.: 544,019

Related U.S. Application Data

[63] Continuation of Ser. No. 355,902, April 30, 1973, abandoned.

[52] U.S. Cl. .................................. 417/36; 417/390
[51] Int. Cl.² ........................................ F04B 49/00
[58] Field of Search .............. 417/36, 46, 271, 390; 60/445

[56] References Cited
UNITED STATES PATENTS

| | | | |
|---|---|---|---|
| 2,467,398 | 4/1949 | Miller | 417/46 |
| 3,199,793 | 3/1965 | Sabi | 60/445 |
| 3,393,642 | 7/1968 | Kordim et al. | 417/36 |
| 3,587,765 | 6/1971 | McFarland | 60/445 |
| 3,672,793 | 6/1972 | Yowell | 417/271 |

*Primary Examiner*—William L. Freeh
*Attorney, Agent, or Firm*—Malin & Haley

[57] ABSTRACT

A liquid pump and control system for maintaining a predetermined level of liquid in a vessel comprising a liquid level sensing means, a variable displacement hydraulic pump, a control means connected to said liquid level sensing means and said variable hydraulic pump, a constant speed driving means connected to said variable hydraulic pump, a hydraulically actuated motor in fluid communication with said variable hydraulic pump and a liquid pump in fluid communication with said liquid vessel for evacuating fluid therefrom, said liquid pump connected and driven by said hydraulic motor. The liquid level sensing means within the liquid containing vessel determines the fluid level in the vessel, provides an electric signal to a variable displacement hydraulic pump which is driven by a constant speed electric motor. The variable volume output of the hydraulic pump is coupled to and drives the hydraulic motor at an RPM proportional to the pump volume. The hydraulic motor drives the fluid pump, the inlet of which is coupled in fluid communication with the vessel. Thus utilizing applicant's device the liquid pump will have a variable volume output to control the water level in a chamber such as a wet well, utilizing a constant speed electric drive.

4 Claims, 1 Drawing Figure

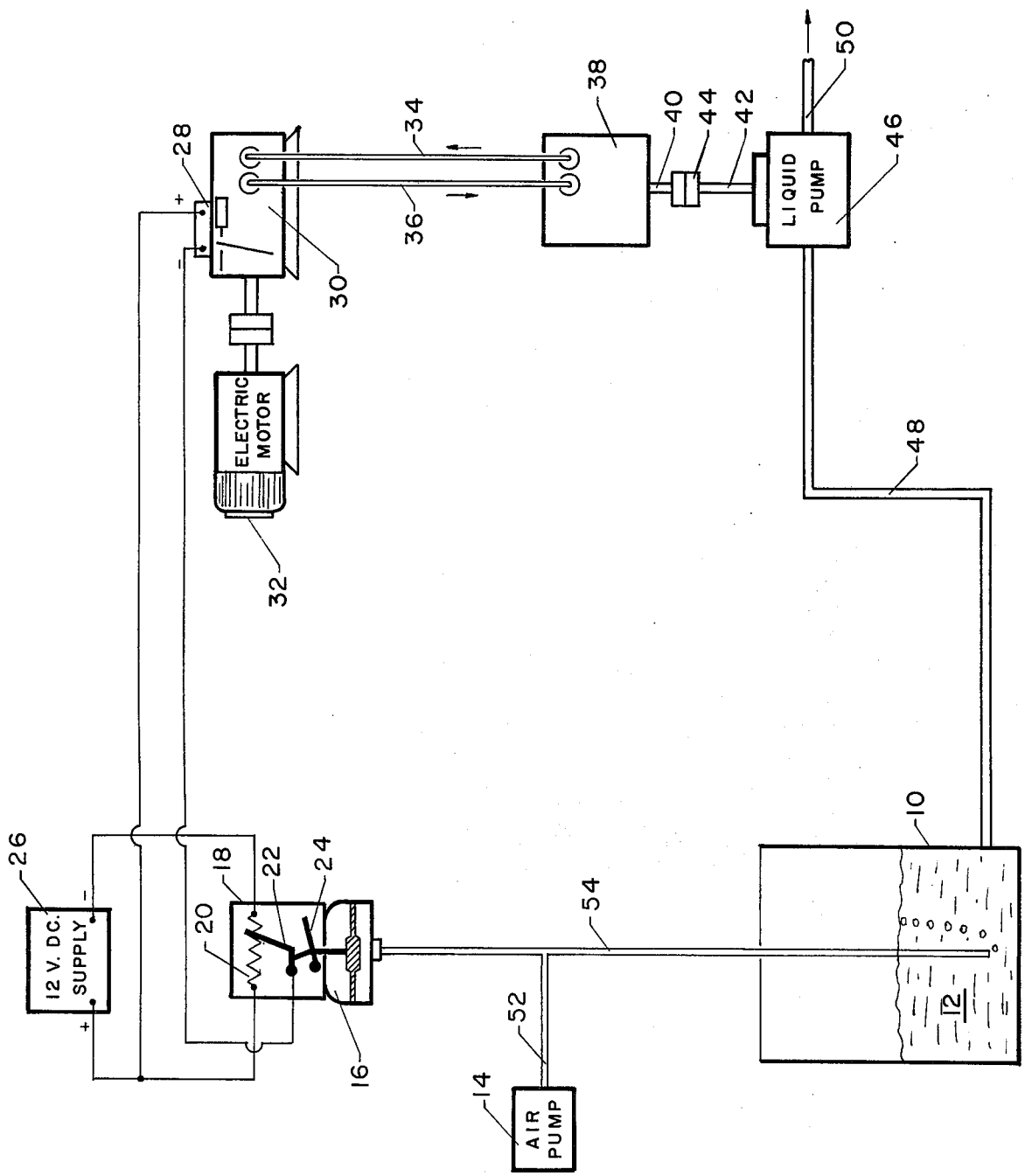

FLUID PUMP DRIVING CONTROL

This is a continuation of application Ser. No. 355,902 filed Apr. 30, 1973, now abandoned.

BACKGROUND OF THE INVENTION

This invention relates generally to a fluid pumping system, and specifically to a fluid pumping system which will maintain a relatively constant fluid level in a well or vessel regardless of the fluid input into the vessel, while employing a constant speed drive motor.

In the past, fluid pumping systems such as utilized with supplemental sewage storage devices have been plagued with the problem of having random and unusual large inputs of fluid into a wet well as would be caused by rainstorms and the like, which result in increased demand on the pumping system. Elaborate control devices are necessary for controlling electric motors to prevent them from burning out while maintaining the wet well fluid level at a desirable point to prevent overflow of sewage into the streets. Applicant's pumping system utilizes an electric pump drive motor having a simplified control feature which allows the motor to be driven at a constant speed at all times while providing a variable volume output pump from the wet well. A sensor determines the proper level of liquid to be maintained and a control regulates the volume output of the pump. Thus, applicant's pumping system is adjustable to increased or unusual demands on the system without changing the load on an electric motor driving the pumps.

BRIEF DESCRIPTION OF THE INVENTION

A liquid pumping system for maintaining a constant level of liquid in a vessel comprising a fluid level sensing means, a control means coupled to a sensing means, said control means having an output signal, a variable output hydraulic pumping means connected to the control means, said control means signal determining the volume output of said hydraulic pump means, a constant speed driving means connected to said hydraulic pump, a hydraulic motor in fluid communication with the output of said hydraulic pump, a liquid receiving vessel, a liquid pump in fluid communication with said vessel for evacuating fluid from said vessel, said hydraulic motor connected to said fluid pump for driving said fluid pump, said fluid pump having a variable volume output determined by the driving RPM of said hydraulic motor.

In operation, the vessel contains a liquid for which a predetermined maximum fluid level is established. The sensing means connected into the fluid within the vessel provides a signal input into the control circuit which establishes changes in the predetermined fluid level. The control means sends an output signal to the variable hydraulic pump, the signal being a function of the fluid level in the vessel. The control signal then changes, if necessary, the volume output of the hydraulic pump which is driven by the constant speed motor, such as an electric motor. The output volume from the hydraulic pump then drives the hydraulic motor at an RPM dependent upon the control signal as received by the hydraulic pump. This determines the volume output of the fluid pump which is connected to the vessel as a function of the driving rotation of the hydraulic motor.

Thus, an increase in the liquid level in the vessel will increase the volume output of the hydraulic pump thereby increasing the output of the fluid pump.

As the output of the liquid pump increases to reduce the fluid level in the vessel, the excess fluid above the predetermined level is evacuated from the vessel until the fluid level is returned to the predetermined level. At this time the signal from the sensing means to the control device will allow the hydraulic pump output to be zero. The entire system may shut off at this point or the electric motor allowed to turn at a constant speed to be ready for any additional increases in the fluid level. Thus, the necessity for varying the speeds of an electric motor for unusually large demand situations has been eliminated. A constant fluid level may be maintained in the vessel.

It is an object of this invention to provide a fluid pumping control system which will maintain a predetermined fluid level in a vessel utilizing a constant speed drive builder.

It is another object of this invention to provide an electro-hydraulic system to maintain a fluid level which may adjust to unusual demands and loads in the fluid level system.

And still yet another object of this invention is a pumping system which will prevent motor burn out or overload with an automatic control feature.

In accordance with these and other objects which will be apparent hereinafter, the instant invention will now be described with particular reference to the accompanying drawing.

BRIEF DESCRIPTION OF THE DRAWING

The drawing shows a schematic view of the preferred embodiment of applicant's invention.

PREFERRED EMBODIMENT OF THE INVENTION

Referring now to the drawing, applicant's pumping system is shown comprising a fluid vessel 10, such as wet well having a liquid 12 shown at a predetermined level. Air supply line 54 is disposed with one end submerged within fluid 12 and connected at its opposite end to a pressure transducer 16, and having a source line 52 connected into its midsection, terminating in air pump 14. Pressure transducer 16 has an expandable member such as a diaphram mechanically connected to linkage 24 to a variable rheostat 18, having a wiper arm 22 connected to resistance 20 electrically connected to a DC voltage supply such as battery 26. Movement of the wiper arm 22 changes the resistance and consequently the voltage or current in the electrical line resulting in an output signal received in actuator 28 which is connected to a variable swash plate in hydraulic pump 30. Thus the changing the current or voltage in actuator 28 will move the swash plate to a specific position. The hydraulic pump 30 is driven by a constant speed electric motor 32. The volume output of hydraulic fluid from hydraulic pump 30 is determined, however, by the angle of the swash plate which allows it to increase hydraulic output in line 36 terminating in hydraulic motor 38. A return input line 34 is provided between the hydraulic motor 38 and the hydraulic pump 30. The mechanical output shaft 40 of the hydraulic motor 38 is connected to pump shaft 42 by coupling member 44. The fluid pump 46 is a variable output pump such as a standard displacement fluid pump having an output fluid line 50 and an input conduit 48 connected into vessel 10.

In operation, air pump 14 provides air pressure in conduit 54 by pumping air into the liquid 12 of vessel 10. Pressure in line 54 is determined by the depth of the fluid 12 in that increasing the fluid level increases the hydrostatic pressure of air being pumped out the bottom of the tube. This will cause a change in line pressure to the transducer which, as the line pressure increases, will cause the wiper blade 22 to vary the resistance in the control circuit coupled to the voltage supply battery 26. Thus, the current or voltage will be increased to actuator 28, opening the swash plates to provide a larger fluid flow from the hydraulic pump 30. This will increase the rotation of shaft 40 from hydraulic motor 38 thereby increasing the pump volume output pump 46. Increased fluid will then be evacuated from vessel 10 reducing the fluid level to the predetermined desired position.

The control section which includes the pressure transducer, variable rheostat and the actuator 28 is adjusted so that at a predetermined fluid level within the wet well 10, the current to the actuator 28 will have the swash plate angle at zero, thus producing no net output of fluid from the hydraulic pump. This signal may also shut the entire system down or allows the electric motor to continue operating at a constant speed. As sewage or other fluids are received in the wet well, the swash plate angle will then be varied to pump out excess liquid. Unusually large loads from rainstorms or the like which cause rapid increase in fluid level will operate the system at full capacity without changing the speed of the electric motor.

The instant invention has been shown and described herein in what is considered to be the most practical and preferred embodiment. It is recognized, however, that departures may be made therefrom within the scope of the invention and that obvious modifications will occur to a person skilled in the art.

What I claim Is:

1. A system for maintaining a predetermined fluid level in a fluid storage wet well to compensate for variable quantities of fluid received in said wet well comprising:
   fluid storage wet well,
   a fluid level sensing means connected within said storage wet well providing a variable output signal proportional to the level of the fluid contained therein;
   a variable output hydraulic pump, said pump including a means for varying the hydraulic output of said pump;
   a constant speed electrical drive means connected to said variable hydraulic pump for driving said hydraulic pump;
   a hydraulic motor in fluid communication with the output of said variable hydraulic pump, the hydraulic motor providing a mechanical drive output in response to fluid received from said variable hydraulic pump;
   a variable volume fluid pump connected to the mechanical drive output of said hydraulic motor, said fluid pump having a fluid input connected into said storage wet well and a fluid output;
   a variable volume fluid pump control means having an input circuit connected to said fluid level sensing means and an output circuit connected to said means for varying the output of said variable hydraulic pump, said control means output signal controlling the hydraulic output of said variable output hydraulic pump as a function of the output signal from said fluid level sensing means.

2. A fluid regulating system, as in claim 1, wherein: said drive means is driven at a constant speed.

3. A fluid control system, as in claim 2, wherein:
   said control means includes a rheostat, a voltage supply, said rheostat connected to said sensing means adjustable proportionally to changes in said sensing means;
   an electro-mechanical displacement means connected to the output voltage in said rheostat providing a linear mechanical movement proportional to the position of the rheostat, said hydraulic pump having a swash plate of variable angles mechanically connected to said linear displacement means whereby the swash plate angle is controlled by the voltage signal received through the variable rheostat.

4. A fluid pumping and control system for maintaining the liquid level at or below a predetermined level comprising:
   a wet well for receiving liquid;
   an air pressure transducer;
   an air conduit coupled at one end to said air pressure transducer and its opposite open end into fluid disposed within said wet well;
   an air pressure source connected to said air conduit line for providing air pressure within said line;
   a rheostat mechanically connected to the output of said pressure transducer and adjustable proportionally to changes in said pressure transducer;
   an electrical circuit having said rheostat electrically coupled thereto;
   a voltage supply connected within said electrical circuit;
   a swash plate variable volume hydraulic pump;
   a hydraulic motor in fluid communication with said hydraulic pump, the output of said hydraulic pump connected to drive said hydraulic motor;
   a constant speed electric motor connected to drive said hydraulic pump;
   a variable volume output liquid pump having a driven shaft connected to the output driving shaft of said hydraulic motor;
   a fluid conduit connected at one end to said wet well to receive fluids contained therein having at opposite end connected as the input of said liquid pump;
   an output fluid line connected to outlet section of said liquid pump; and
   an electro-mechanical transducer coupled to said electrical circuit and to the swash plate of said hydraulic pump, said voltage in said electrical circuit proportionally controlling the angle of said swash plate to provide a variable volume output from said hydraulic pump, whereby the fluid level of said wet well will be kept at a predetermined or below level by varying the volume output of said liquid pump.

* * * * *